(12) United States Patent
Thomas

(10) Patent No.: US 9,311,399 B2
(45) Date of Patent: *Apr. 12, 2016

(54) SYSTEM AND METHOD FOR PROVIDING AN UPDATING ON-LINE FORMS AND REGISTRATIONS

(71) Applicant: C. Douglass Thomas, Saratoga, CA (US)

(72) Inventor: C. Douglass Thomas, Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,658

(22) Filed: Dec. 21, 2012

(65) Prior Publication Data

US 2014/0181129 A1 Jun. 26, 2014

Related U.S. Application Data

(63) Continuation of application No. 09/655,273, filed on Sep. 5, 2000, now Pat. No. 8,364,688, which is a continuation-in-part of application No. 09/458,834, filed on Dec. 13, 1999, now Pat. No. 6,873,992.

(60) Provisional application No. 60/152,683, filed on Sep. 7, 1999.

(51) Int. Cl.
G06F 17/30 (2006.01)

(52) U.S. Cl.
CPC ............................. *G06F 17/30861* (2013.01)

(58) Field of Classification Search
USPC .................. 707/709, 721, 736, 758, 767, 802
See application file for complete search history.

(56) References Cited

U.S. PATENT DOCUMENTS

| 5,537,586 | A |   | 7/1996  | Amram et al. |
| 5,649,186 | A |   | 7/1997  | Ferguson |
| 5,678,042 | A |   | 10/1997 | Pisello et al. |
| 5,699,427 | A |   | 12/1997 | Chow et al. |
| 5,748,954 | A |   | 5/1998  | Mauldin |
| 5,761,662 | A |   | 6/1998  | Dasan |
| 5,794,233 | A |   | 8/1998  | Rubinstein |
| 5,799,318 | A |   | 8/1998  | Cardinal et al. |
| 5,895,468 | A |   | 4/1999  | Whitmyer, Jr. |
| 5,898,836 | A | * | 4/1999  | Freivald ............. G06F 17/3089 707/E17.116 |
| 5,978,842 | A |   | 11/1999 | Noble et al. |
| 5,983,268 | A |   | 11/1999 | Freivald et al. |
| 5,983,351 | A | * | 11/1999 | Glogau ............... G06F 17/3089 707/E17.116 |
| 5,987,464 | A |   | 11/1999 | Schneider |
| 6,012,087 | A |   | 1/2000  | Freivald et al. |

(Continued)

FOREIGN PATENT DOCUMENTS

| WO | WO 99/09726    | 2/1999 |
| WO | WO 01/20484 A2 | 3/2001 |

(Continued)

OTHER PUBLICATIONS

Trademark Electronic Application System (TEAS), Home Page, U.S. Patent and Trademark Office, pp. 1-2, downloaded Sep. 4, 2000.

(Continued)

*Primary Examiner* — Sana Al Hashemi

(57) ABSTRACT

Improved approaches to completing, submitting and updating on-line forms or registrations are disclosed. In one embodiment, an on-line form completion agent or an on-line registration agent intelligently guides an on-line form completion or registration process. In another embodiment, a registration is automatically monitored to determine whether and when the registration needs updated.

28 Claims, 13 Drawing Sheets

(56) References Cited

U.S. PATENT DOCUMENTS

| | | | |
|---|---|---|---|
| 6,049,801 | A | 4/2000 | Whitmyer, Jr. |
| 6,135,646 | A | 10/2000 | Kahn et al. |
| 6,182,078 | B1 | 1/2001 | Whitmyer, Jr. |
| 6,332,158 | B1 | 12/2001 | Risley et al. |
| 6,370,535 | B1 | 4/2002 | Shapiro et al. |
| 6,393,423 | B1 | 5/2002 | Goedken |
| 6,560,634 | B1 | 5/2003 | Broadhurst |
| 6,649,186 | B1 | 11/2003 | Ferguson |
| 6,678,717 | B1 | 1/2004 | Schneider et al. |
| 6,681,369 | B2 | 1/2004 | Meunier et al. |
| 6,873,992 | B1 | 3/2005 | Thomas |
| 6,880,007 | B1 | 4/2005 | Gardos et al. |
| 7,010,568 | B1 | 3/2006 | Schneider et al. |
| 7,143,055 | B1 | 11/2006 | Perkowski |
| 7,167,904 | B1 | 1/2007 | Devarajan et al. |
| 7,251,826 | B1 | 7/2007 | Gardos et al. |
| 7,747,592 | B2 | 6/2010 | Thomas |
| 8,280,868 | B2 | 10/2012 | Thomas |
| 8,364,688 | B1 | 1/2013 | Thomas |
| 8,694,482 | B2 | 4/2014 | Thomas |
| 2002/0129013 | A1 | 9/2002 | Thomas |
| 2004/0230566 | A1 | 11/2004 | Balijepalli et al. |
| 2005/0102354 | A1 | 5/2005 | Hollenbeck et al. |
| 2005/0144323 | A1 | 6/2005 | Gardoes et al. |
| 2005/0149487 | A1 | 7/2005 | Celik |
| 2006/0203969 | A1 | 9/2006 | Jorasch et al. |
| 2008/0005342 | A1 | 1/2008 | Schneider |
| 2010/0228759 | A1 | 9/2010 | Thomas |
| 2010/0299304 | A1 | 11/2010 | Vasudevan |

FOREIGN PATENT DOCUMENTS

| | | | |
|---|---|---|---|
| WO | WO 01/22286 A1 | 3/2001 | |
| WO | WO 01/29001 A2 | 4/2001 | |
| WO | WO 01/41401 A2 | 6/2001 | |
| WO | WO 01/57728 A1 | 8/2001 | |
| WO | WO 01/77839 A1 | 10/2001 | |
| WO | WO 01/77892 A1 | 10/2001 | |
| WO | WO 01/95209 A2 | 12/2001 | |
| WO | WO 01/97486 A2 | 12/2001 | |
| WO | WO 02/03656 A1 | 1/2002 | |

OTHER PUBLICATIONS

Trademark Electronic Application System (TEAS), eTEASforms webpage, U.S. Patent and Trademark Office, pp. 1-4, downloaded Sep. 4, 2000.
Trademark/Service Mark Application Form Wizard for eTEAS, Wizard form webpage, U.S. Patent and Trademark Office, pp. 1-2, downloaded Sep. 4, 2000.
Trademark/Service Mark Application, Principal Register, with Declaration Form for eTEAS, Application form webpage, U.S. Patent and Trademark Office, pp. 1-5, downloaded Sep. 4, 2000.
"Library of Congress and Copyright Office sign Agreement with UMI", from Information Today, Mar. 1999, vol. 16, Issue 3, p. 3.
"Copyright Office Tests Web System", from Library Journal, May 1996, vol. 121, issue 9, p. 17.
Guthrie, M., "The Form Revolution. Creating simple scripts to process PDF Web forms," Adobe Magazine, Autumn 1999.
"Adobe Introduces Interactive PDF Web Forms that Display and Print Exactly as Intended", Adobe Systems Inc., Press Release, Jan. 28, 1998.
White Paper for PDF+Forms, Cardiff Software, Inc., 1999.
"Collect Information online with interactive Forms," Online product information for Adobe Acrobat, Adobe Systems, Inc., 1999.
"Convert Web pages to Adobe PDF files for offline use", Online product information for Adobe Acrobat, Adobe Systems, Inc., 1999.
"Patent and Trademark Office Updates Trademark Electronic Application System Facilitating Ease of Electronic Filing", U.S. Patent and Trademark Office, Press Release, Nov. 9, 1999.
Trademark Electronic Application System (TEAS), Home Page, US Patent and Trademark Office, pp. 1-2, downloaded Sep. 4, 2000.
Trademark/Service Mark Application Form Wizard for eTEAS Wizard form webpage, U.S. Patent and Trademark Office, pp. 1-2, downloaded Sep. 4, 2000.
Trademark/Service Mark Application, Principle Register, with Declaration Form for eTEAS, Application form webpage, U.S. Patent and Trademark Office, pp. 1-2, downloaded Sep. 4, 2000.
Office Action for U.S. Appl. No. 09/655,273, mailed Jul. 31, 2002.
Final Office Action for U.S. Appl. No. 09/655,273, mailed Jan. 7, 2003.
Office Action for U.S. Appl. No. 09/655,273, mailed Aug. 25, 2003.
Final Office Action for U.S. Appl. No. 09/655,273, mailed Dec. 17, 2003.
Advisory Action for U.S. Appl. No. 09/655,273, mailed Feb. 2, 2004.
Advisory Action for U.S. Appl. No. 09/655,273, mailed Feb. 26, 2004.
Office Action for U.S. Appl. No. 09/655,273, mailed Apr. 7, 2004.
Office Action for U.S. Appl. No. 09/655,273, mailed Jan. 12, 2005.
Final Office Action for U.S. Appl. No. 09/655,273, mailed Jul. 13, 2005.
Office Action for U.S. Appl. No. 09/655,273, mailed Jan. 23, 2007.
Final Office Action for U.S. Appl. No. 09/655,273, mailed Jul. 10, 2007.
Office Action for U.S. Appl. No. 09/655,273, mailed Dec. 28, 2007.
Final Office Action for U.S. Appl. No. 09/655,273, mailed Jun. 30, 2008.
Office Action for U.S. Appl. No. 09/655,273, mailed Jan. 16, 2009.
Final Office Action for U.S. Appl. No. 09/655,273, mailed Jul. 6, 2009.
Examiner's Answer for U.S. Appl. No. 09/655,273, mailed Jul. 6, 2009.
Notice of Allowance for U.S. Appl. No. 09/655,273, mailed Nov. 2, 2012.
Copyright Office Electronic Registration, Recordation ad Deposit System (CORDS), Home page, U.S. Copyright Office, pp. 1-5, downloaded, Sep. 4, 2000.
US 6,338,082, 1/2002, Schneider et al. (withdrawn).
Hypermart—Members' Area, DNS Utilities—domain name availability, www.hypermart.net, downloaded 1999, pp. 1-2.
Register.com—Domain Name Registration Services Register.com, Inc., downloaded 1999, pp. 1-2.
Office Action for U.S. Appl. No. 10/039,341, mailed May 17, 2006.
Final Office Action for U.S. Appl. No. 10/039,341, mailed Apr. 5, 2007.
Advisory Action for U.S. Appl. No. 10/039,341, mailed Jul. 3, 2007.
Notice of Panel Decision from Pre-Appeal Brief Review, re U.S. Appl. No. 10/039,341, mailed Aug. 3, 2007.
Office Action for U.S. Appl. No. 10/039,341, mailed Oct. 18, 2007.
Final Office Action for U.S. Appl. No. 10/039,341, mailed May 16, 2008.
Office Action for U.S. Appl. No. 10/039,341, mailed Nov. 26, 2008.
Final Office Action for U.S. Appl. No. 10/039,341, mailed May 11, 2009.
Advisory Action for U.S. Appl. No. 10/039,341, mailed Aug. 7, 2009.
Office Action for U.S. Appl. No. 10/039,341, mailed Jan. 13, 2006.
Office Action for U.S. Appl. No. 10/039,341, mailed Oct. 26, 2009.
Notice of Allowance for U.S. Appl. No. 10/039,341, mailed Feb. 17, 2010.
Office Action for U.S. Appl. No. 12/785,311, mailed Nov. 23, 2010.
Final Office Action for U.S. Appl. No. 12/785,311, mailed Jun. 8, 2011.
Office Action for U.S. Appl. No. 12/785,311, Oct. 5, 2011.
Notice of Allowance for U.S. Appl. No. 12/785,311, mailed May 3, 2012.
Office Action for U.S. Appl. No. 13/571,250, mailed Jan. 23, 2013.
Final Office Action for U.S. Appl. No. 13/571,250, mailed May 10, 2013.
Advisory Action for U.S. Appl. No. 13/571,250, mailed Aug. 6, 2013.
Notice of Allowance for U.S. Appl. No. 13/571,250, mailed Sep. 16, 2013.
Notice of Allowance for U.S. Appl. No. 13/571,250, mailed Dec. 16, 2013.
Office Action for U.S. Appl. No. 14/109,957 mailed Jul. 17, 2014.

(56) References Cited

OTHER PUBLICATIONS

Final Office Action for U.S. Appl. No. 14/189,957 mailed Oct. 6, 2014.
Notice of Allowance for U.S. Appl. No. 14/189,957 mailed Jan. 26, 2015.
Notice of Allowance for U.S. Appl. No. 14/189,957 mailed May 11, 2015.
Final Office Action for U.S. Appl. No. 10/039,341, mailed May 16, 2008.Office Action for U.S. Appl. No. 10/039,341, mailed Nov. 26, 2008.

* cited by examiner

SYSTEM AND METHOD FOR PROVIDING AN UPDATING ON-LINE FORMS AND REGISTRATIONS

CROSS REFERENCE TO RELATED APPLICATIONS

This application is a continuation of U.S. application Ser. No. 09/655,273, filed Sep. 5, 2000, and entitled "SYSTEM AND METHOD FOR PROVIDING AND UPDATING ON-LINE FORMS AND REGISTRATIONS," which is hereby incorporated herein by reference, which in turn (i) is a continuation-in-part of U.S. application Ser. No. 09/458,834, filed Dec. 13, 1999, and entitled "METHOD AND SYSTEM FOR AUTOMATED DOCUMENT GENERATION," which is hereby incorporated herein by reference; and (ii) claims priority of U.S. Provisional Application No. 60/152,683, filed Sep. 7, 1999, entitled "SYSTEM AND METHOD FOR ELECTRONIC FILING OF DOCUMENTS, PROVIDING AND UPDATING ON-LINE FORMS AND REGISTRATIONS, OR MONITORING DOMAINS," which is hereby incorporated herein by reference.

BACKGROUND OF THE INVENTION

1. Field of the Invention

The present invention relates to on-line operations and, more particularly, to operations pertaining to on-line forms and registrations.

2. Description of the Related Art

Today, the Internet has facilitated electronic transmission and filing of documents. Various business or legal forms and documents are available on-line via the Internet. Electronic filing of certain documents or forms (including registrations) is permitted, such as patent or trademark applications, product or user registrations, or court filings.

Nevertheless, the sophistication often required to prepare or file such documents or forms is significant and thus renders ordinary lay persons seriously disadvantaged in utilizing such on-line documents or forms. Many times the documents or forms require careful wording for clarity or legal purposes. As an example, legal documents need to be carefully crafted to provide the legal protection sought. Given the complexities often involved, the creation and filing of electronic documents is largely still manually performed by skilled or experienced persons. There are many books and sample documents (both on-line and off-line) that can be found after some effort, but it is difficult to not only locate the appropriate samples or forms but also to complete or alter the samples or forms for a user's particular situation.

Thus, there is a need for improved techniques for improved approaches to enable and assist unsophisticated persons to utilize on-line forms or documents.

SUMMARY

Broadly speaking, the invention pertains to improved approaches to completing, submitting and updating on-line forms or registrations.

One aspect of the invention pertains to techniques for completing on-line forms, on-line filings or registrations. In one embodiment, the invention is an on-line form completion agent or an on-line registration agent for intelligently guiding on-line form completion or registration.

Another aspect of the invention pertains to techniques for automatically monitoring a registration to determine whether the registration needs to be updated. While the type of registration can vary widely, e.g., registration form, the registrations have to identify registrations information or registration content that may need monitoring to insure that the registration is up-to-date. The invention is particularly useful for monitoring copyright registrations, more particularly, copyright registrations for on-line works, for example, websites.

The invention can be implemented in numerous ways including, a method, system, device, and a computer readable medium. Several embodiments of the invention are discussed below.

As a computer implemented method for detecting a need to update a prior registration of an on-line site provided on a network, one embodiment of the invention includes at least the acts of: monitoring changes to the on-line site to determine a change value; comparing the change value with a threshold value; and determining the need to update the prior registration of the on-line site when the change value exceeds the threshold value.

As a computer-implemented method for monitoring content of a website, one embodiment of the invention includes at least the acts of: identifying an address location for the website; periodically crawling the address location for the website to determine an amount or degree of content change at the website as compared to a prior state of the website; and determining that a registration is needed for the website when the amount or degree of content change exceeds a predetermined threshold.

As a computer implemented method for determining whether a registration update is needed, one embodiment of the invention includes at least the acts of: comparing at least a portion of a website against a corresponding portion of an earlier stored version of the website to produce a change indication; and determining that the registration update is needed for the website based on the change indication.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches to completing, submitting and updating on-line forms or registrations.

One aspect of the invention pertains to techniques for completing on-line forms, on-line filings or registrations. In one embodiment, the invention is an on-line form completion agent or an on-line registration agent for intelligently guiding on-line form completion or registration.

Another aspect of the invention pertains to techniques for automatically monitoring a registration to determine whether the registration needs to be updated. While the type of registration can vary widely, e.g., registration form, the registrations have to identify registrations information or registration content that may need monitoring to insure that the registration is up to date. The invention is particularly useful for monitoring copyright registrations, more particularly, copyright registrations for on-line works, for example, websites.

Embodiments of this aspect of the invention are discussed below with reference to FIGS. 1A-8B However, those skilled in the art will readily appreciate that the detailed description given herein with respect to these figures is for explanatory purposes as the invention extends beyond these limited embodiments.

As previously noted, one aspect of the invention pertains to techniques for completing on-line forms, on-line filings or registrations. In one embodiment, the invention is an on-line form completion agent or an on-line registration agent for intelligently guiding an on-line registration.

Figure 1A:
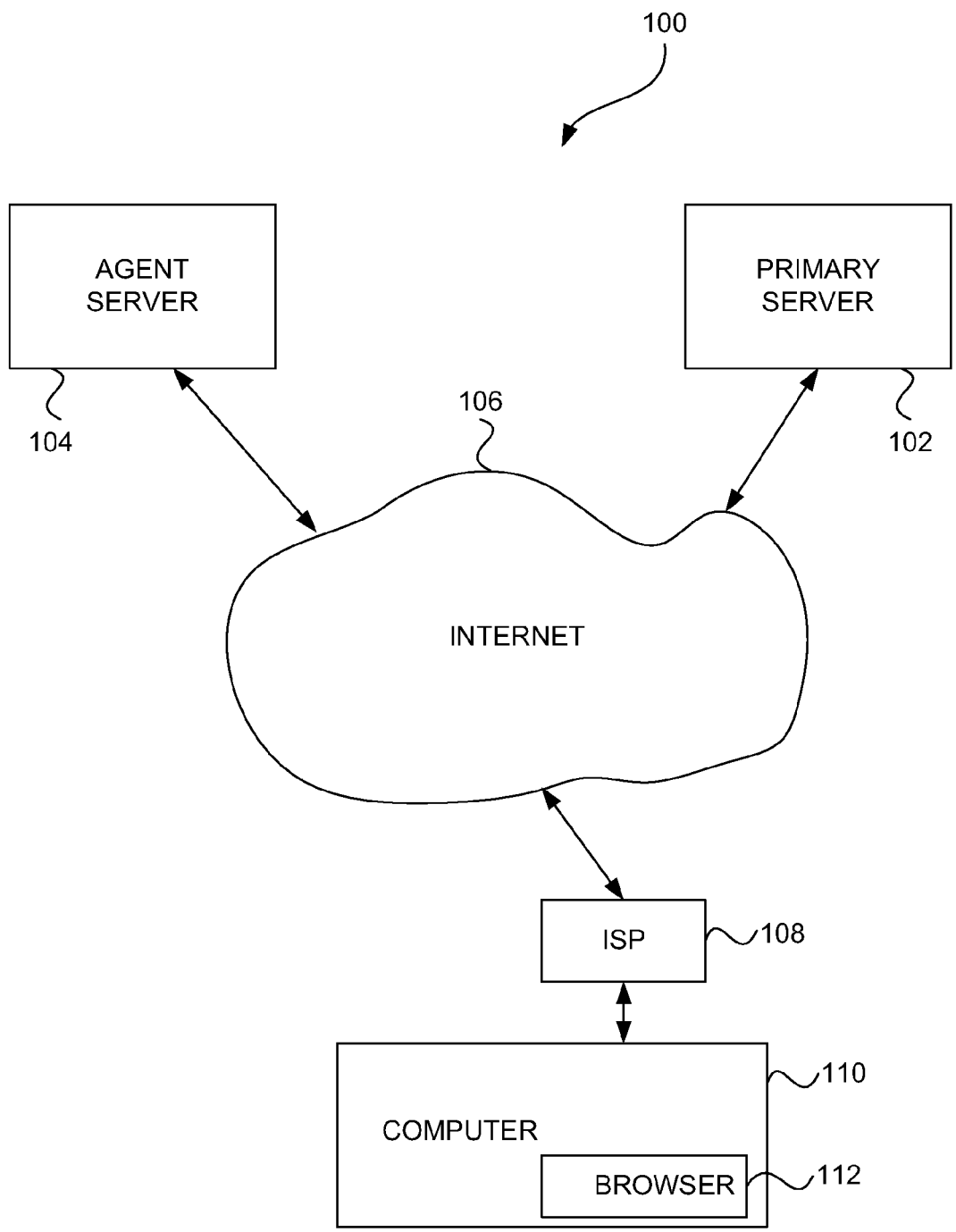
FIG. 1A is a block diagram of a web agent system according to one embodiment of the invention.

FIG. 1A is a block diagram of a web agent system 100 according to one embodiment of the invention. The web agent system 100 includes a primary server 102 and an agent server 104. The primary server 102 and the agent server 104 are coupled to the Internet 106. Typically, the primary server 102 and the agent server 104 are coupled to the Internet 106 through high speed connections, such as T1 lines, ISDN lines, etc. The web agent system 100 also includes an Internet service provider (ISP) 108 and a computer 110. A computer 110 includes, among other things, a browser 112 (i.e., network browser) that facilitates a user's access to servers provided on the Internet. In the case of this embodiment, the browser 112 is used to facilitate user access to the agent server 104.

The web agent system 100 operates to provide an improved graphical user interface (GUI) to the user of the browser 112 of the computer 110. In particular, the general scenario is that the user of the browser 112 of the computer 110 desires to interact with the primary server 102 through the Internet 106. However, according to the invention, to provide an enhanced graphical user interface and/or greater sophistication, the browser 112 is instead directed to the agent server 104. The agent server 104 then in turn communicates with the primary server 102 on behalf of the user of the browser 112. As a result, the user of the browser 112 achieves the same results by interacting with the agent server 104 that would be obtained if the user directly interacted with the primary server 102. By communicating with the agent server 104 the browser 112 can receive an improved GUI, can receive additional guidance than provided by the primary server 102, and/or can be required to enter less data than if accessing the primary server 102. Hence, by using the agent server 104 in place of the primary server 102, the user of the browser 112 on the computer 110 is advantageously provided with an enhanced interaction with the agent server 104 than would be available if the browser 112 interacted with the primary server 102.

Figure 1B:
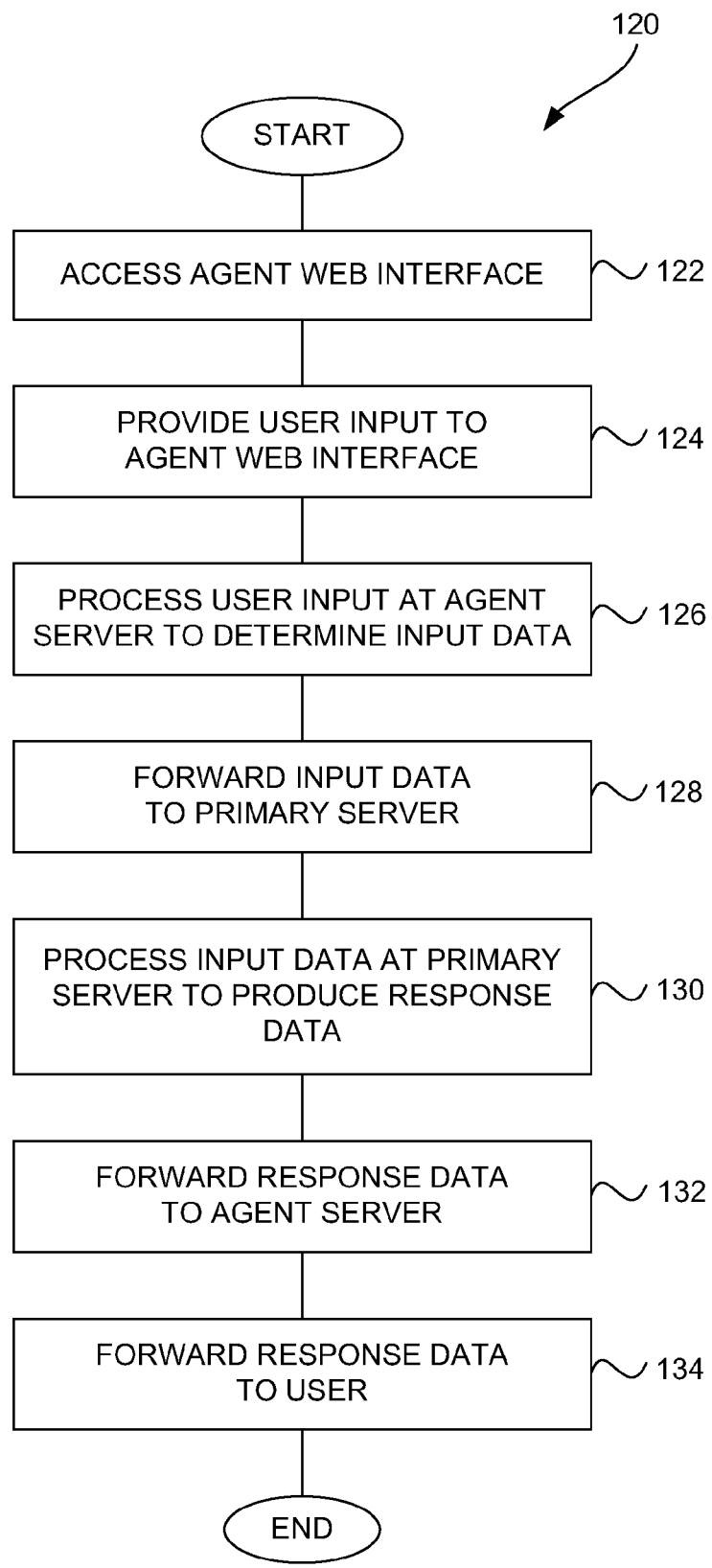
FIG. 1B is a flow diagram of agent processing according to one embodiment of the invention.

FIG. 1B is a flow diagram of agent processing 120 according to one embodiment of the invention. The agent processing 120 is, for example, performed by the web agent system 100 illustrated in FIG. 1A.

The agent processing 120 initially accesses an agent web interface. The agent web interface is provided by the agent server 104. The agent web interface is a GUI offered by the agent server 104 to a visiting user. As an example, the agent web interface can be implemented as a markup language document or page that is displayed by the browser. Examples of markup language are HTML and XML. Next, user input is provided 124 to the agent web interface. Here, the user of the browser 112 inputs data that is supplied to the agent server 104. The agent server 104 then processes 126 the user input to determine input data. The resulting input data is then forwarded 128 from the agent server 104 to the primary server 102. At the primary server 104, the input data is processed 130 to produce response data. Then, the response data is forwarded 132 from the primary server 102 to the agent server 104. Thereafter, the agent server 104 forwards 134 the response data to the user. The agent processing 120 is then complete and ends.

Figure 2A:
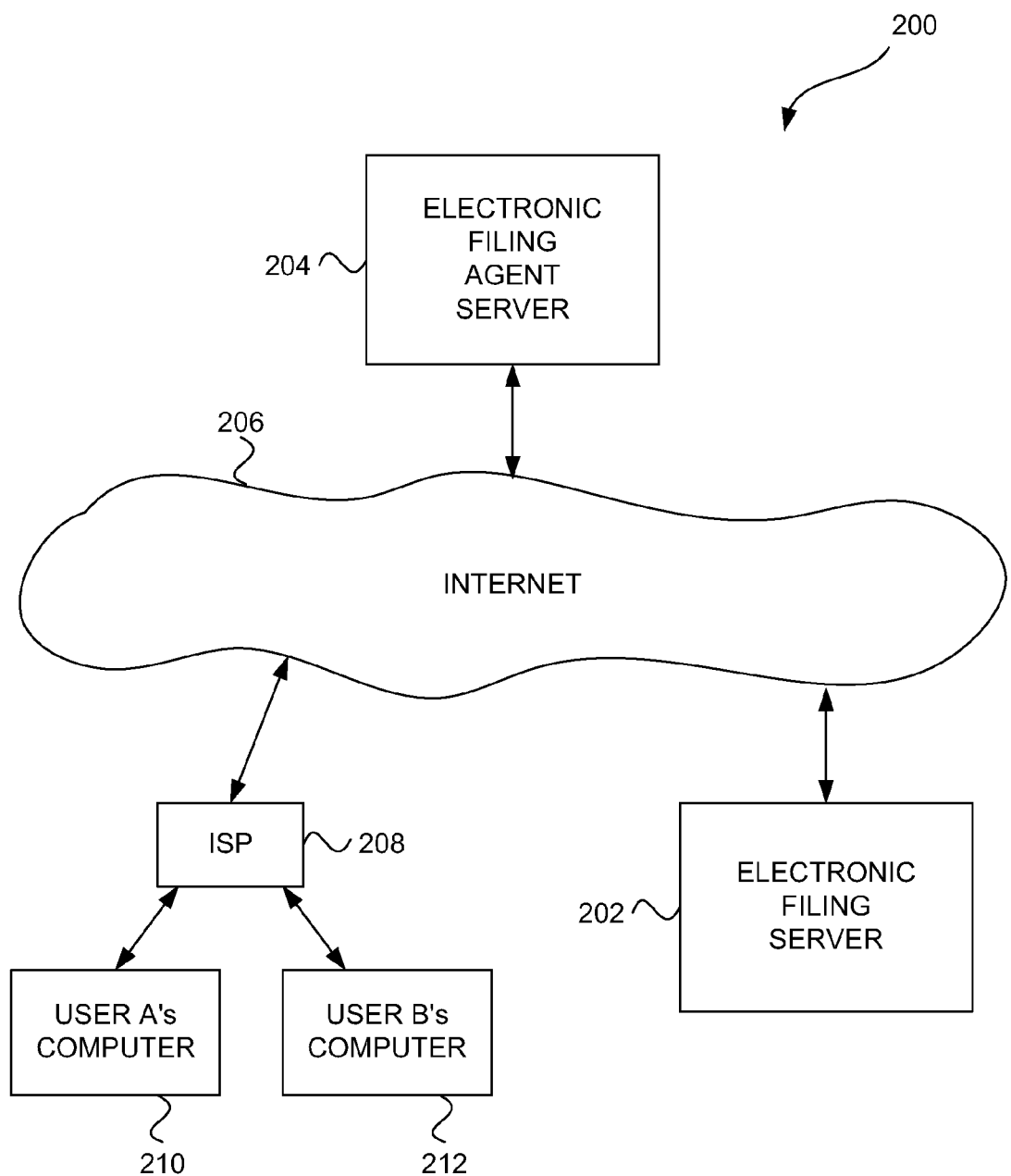
FIG. 2A is a block diagram of an electronic filing system according to one embodiment of the invention.
Figure 2B:
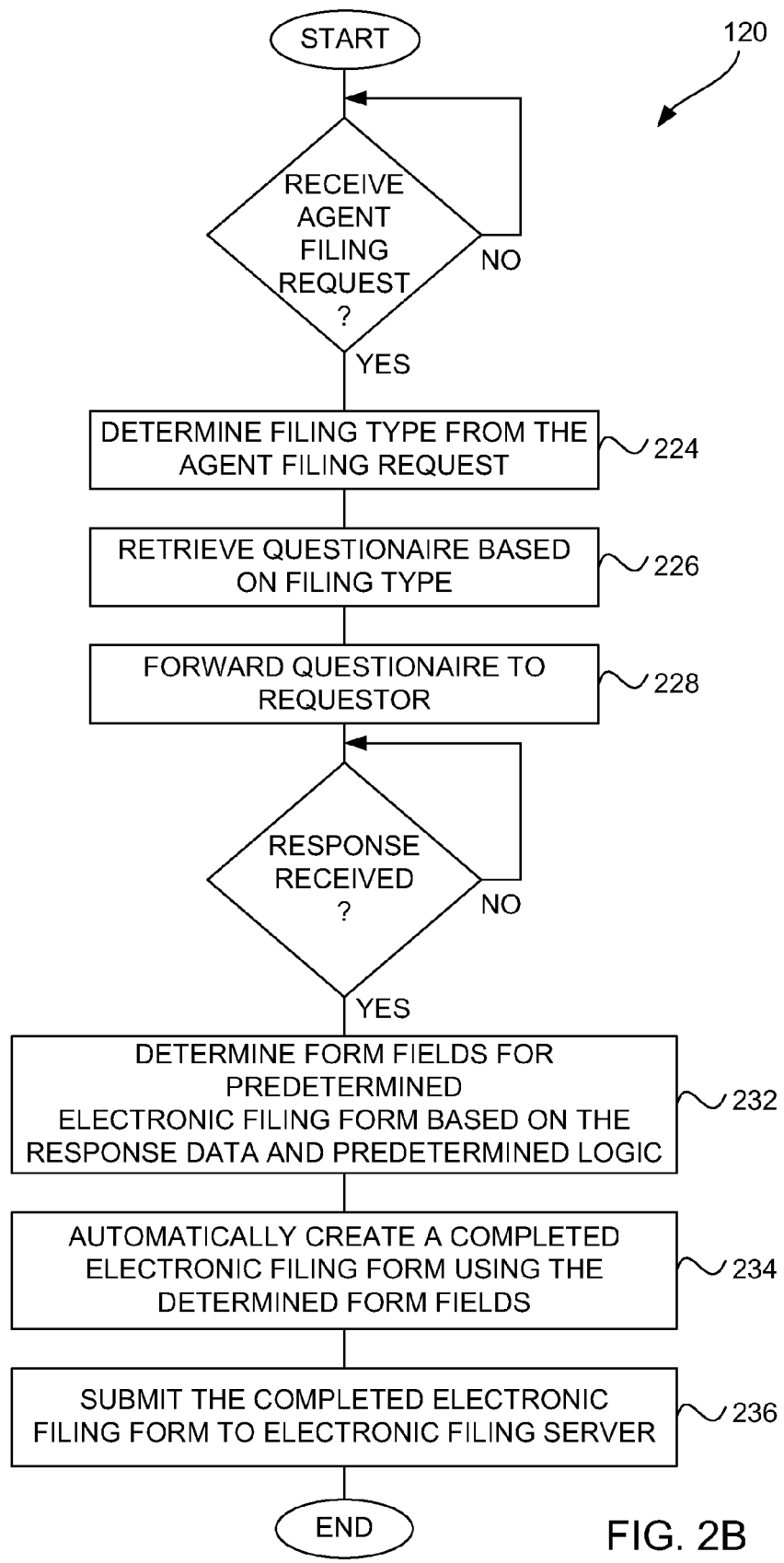
FIG. 2B is a flow diagram of agent processing according to one embodiment of the invention.

In this arrangement, the agent server is acting as an intermediary between the user and the primary server. The agent server can assist the user in accessing information from the primary server or submitting information to the primary server. Although the agent processing 120 is useful in many situations, one particular situation in which the agent processing 120 is particularly useful is for on-line registrations or electronic filings. FIGS. 2A and 2B pertain to an embodiment of the invention concerning electronic filings.

FIG. 2A is a block diagram of an electronic filing system 200 according to one embodiment of the invention. The electronic filing system 200 includes an electronic filing server 202 and an electronic filing agent server 204. The electronic filing server 202 and the electronic filing agent server 204 are coupled to the Internet 206. Typically, the electronic filing server 202 and the electronic filing agent server 204 couple to the Internet 206 through high speed connections. In addition, the electronic filing system 200 includes an ISP 208 that couples to the Internet 206, typically also through a high speed connection. The ISP 208 provides access to the internet 206 to user's computers through a dial-up modem access to the ISP 208. In FIG. 2A, a user A's computer 210 and a user B's computer 212 are able to couple to the ISP 208 to access the Internet 206.

The electronic filing system 200 is capable of achieving electronic filing with the electronic filing server 202. In other words, the electronic filing server 202 supports electronic filing of a document. Either the user A or the user B is able to have a document electronically filed using the electronic filing system 200. According to the invention, the user A or the user B can achieve the electronic filing of a document by accessing the electronic filing agent server 204. Here, the user interacts with the electronic filing agent server 204 and not the electronic filing server 202. This is advantageous for the user because the electronic filing agent server 204 is a much more friendly server and offers enhanced support or guidance in the electronic filing of documents. Once the electronic filing agent server 204 understands the actions taken for the user, the electronic filing agent server 204 interacts with the electronic filing server 202 to effectuate the electronic filing of the document.

FIG. 2B is a flow diagram of agent processing 220 according to one embodiment of the invention. The agent processing 220 begins with a decision 222 that determines whether an agent filing request has been received. As long as no agent filing request has been received, the agent processing 220 awaits such a request. In other words, the agent processing 220 is effectively invoked when an agent filing request has been received.

In any case, once an agent filing request has been received, the agent server determines 224 the filing type from the agent filing request. The filing type represents the type of electronic filing to be formed. For example, the filing type can distinguish between different documents being electronically filed. Here, in this embodiment, the filing type is assumed to identify a form document (or form page) that is to be electronically submitted or filed, namely a predetermined electronic filing form. Then, a questionnaire is retrieved 226 based on the filing type. The questionnaire is then forwarded 228 to the requester. Here, the requester is a user of the user computer 210, 212. The questionnaire can then be presented to the user by a browser or other application executing on the user computer 210, 212.

A decision 230 then determines whether a response has been received. Here, the agent processing 220 awaits a response from the user, namely, the completion and submission of the questionnaire. Once the response has been received, form fields for the predetermined electronic filing form are determined 232 based on the response data and predetermined logic. The predetermined logic typically includes expert logic and is usually at least partially specific to the predetermined electronic filing form. Then, a completed electronic filing form is automatically created 234 using the determined form fields. Thereafter, the completed electronic filing form is submitted 236 to the electronic filing server. Here, the agent server submits the completed electronic filing form to the electronic filing server on behalf of the requestor. The agent processing 220 is then complete and ends. However, the agent processing 220 could also wait for verification or acknowledgement from the electronic filing server and then forwarded a message or an acknowledgement to the requestor.

The web agent system 100 and the agent processing 120 can be for various purposes, such as online registrations or online document generation. The electronic filing system 200 and the agent processing 220 can be used in electronic filing of various types of documents. The documents or registrations can pertain to many different application. One particularly useful application is in legal documents or registrations, such legal documents or registrations can be generated online or electronically filed. The invention enables the legal document or registrations to be prepared properly with ease. As an example, the web agent system 100 or the electronic filing system 200 can be used to generate and/or file electronic documents (including pages or forms), such as (i) a trademark application form which after being prepared can be electronically filed (or downloaded, printed and manually filed) with the U.S. Patent and Trademark Office, (ii) a copyright registration form which after being prepared can be electronically filed (or downloaded, printed and manually filed) with the U.S. copyright office, (iii) a license registration form which after being completed can be electronically filed (or downloaded, printed and manually filed) with the licensor, and (iv) various other documents.

As noted above, another aspect of the invention pertains to techniques for automatically monitoring a registration to determine whether the registration needs updated. While the type of registration can vary widely, e.g., registration form, the registrations have registration information or registration content that may need monitoring to insure that the registration is up-to-date.

The invention is particularly useful for monitoring copyright registrations, more particularly, copyright registrations for on-line works, for example, websites. Specifically, when an initial copyright registration for a website is initially obtained (e.g., through electronic submission), the initial copyright registration should be updated as the content of the website is changed. The invention can be used to automatically determine and notify a webmaster (or other appropriate person) that an updated copyright registration is needed. The submission of the updated copyright registration can also be automated.

Figure 3:
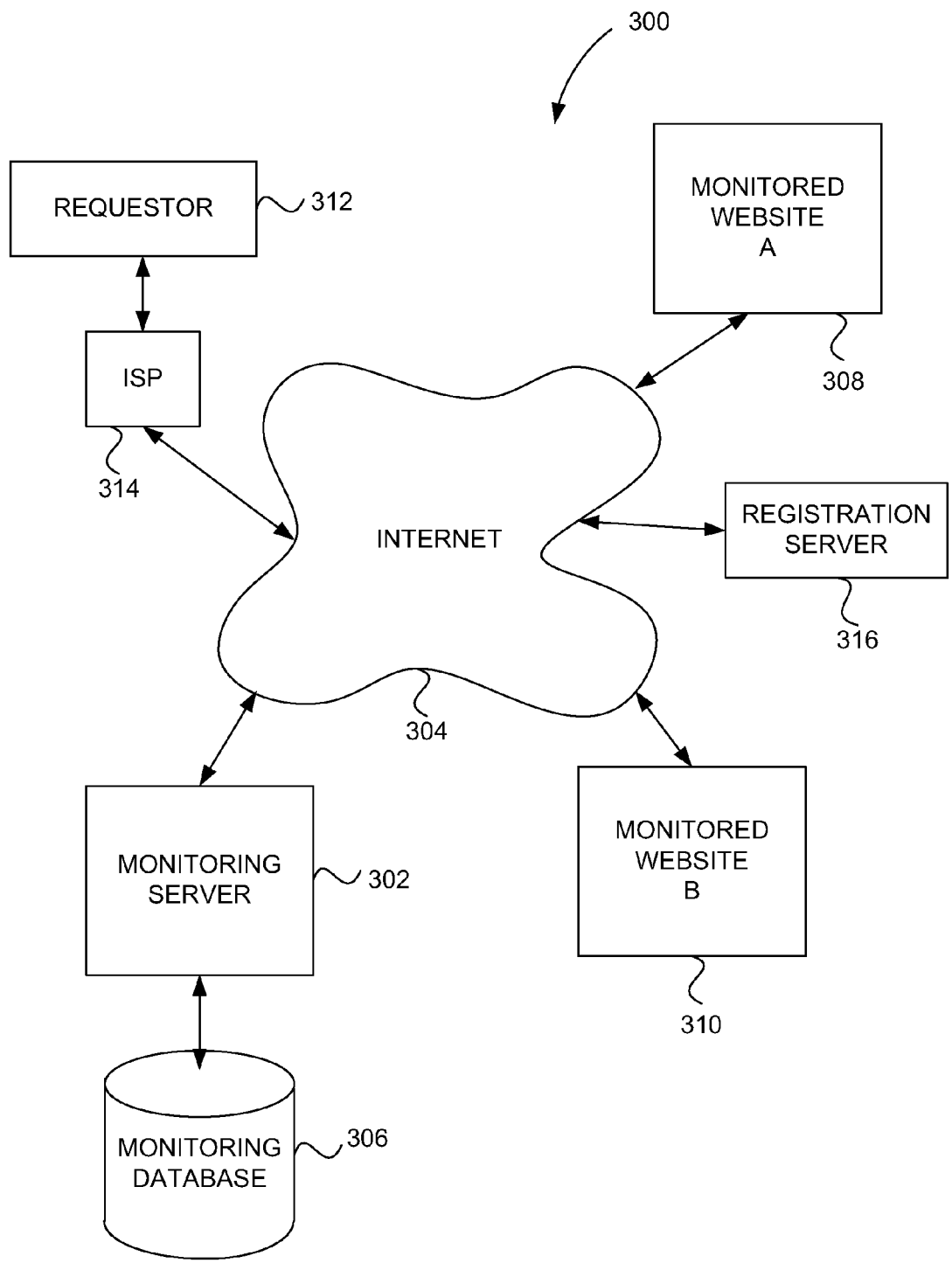
FIG. 3 is a block diagram of a registration monitoring system according to one embodiment of the invention.

FIG. 3 is a block diagram of a registration monitoring system 300 according to one embodiment of the invention. The registration monitoring system 300 includes a monitoring server 302 that connects to the Internet 304. The monitoring server 302 operates to monitor various websites provided on the Internet 304 and to initiate a registration process when a monitored website requires or requests a subsequent registration. The monitoring server 302 is coupled to a monitoring database 306. The monitoring database 306 stores information pertaining to those websites on the Internet 304 to be monitored, i.e., the monitored websites. The information pertaining to the websites includes at least contact information and prior registration information. Although it is assumed that the monitored website has been previously registered, much of the processing can also be used for websites not yet registered.

The registration monitoring system 300 also includes a monitored website A 308 and a monitored website B 310 which are also coupled to the Internet 304. The monitored website A 308 and the monitored website B 310 represent exemplary websites that are coupled to the Internet 304 and monitored by the monitoring server 302. A website is deemed to contain content that is accessible through the Internet 304. The content is provided in pages, i.e., web pages, which can include text, images, video, links, etc. Typically, a webmaster updates (e.g., alters or modifies) the content of the website.

The registration monitoring system 300 also includes a requester 312 that couples to the Internet 304 through an Internet Service Provider (ISP) 314. The requester 312 is a client device that is operated automatically or by user interaction with the monitoring server 302 to request that the monitored website A 308 and/or the monitored website B 310 be monitored. By monitoring the websites, the monitoring server 302 can determine when an updated registration would be appropriate or recommended. When an updated registration for a particular website is deemed appropriate or recommended, an updated registration can be automatically pursued or the requestor can receive a notification from the monitoring server 302 advising that an updated registration is deemed appropriate or recommended. When an updated registration is to be pursued, an updated registration can be submitted on-line to a registration server 316. For example, when the monitoring server 302 is monitoring to determine when an updated copyright registration is needed, then the registration server 316 can pertain to an agent server or a primary server. As examples, the agent server can be the agent server 104, 204, and the primary server can be the primary server 102 or the filing server 202 (e.g., the Copyright Office's server).

Figure 4:
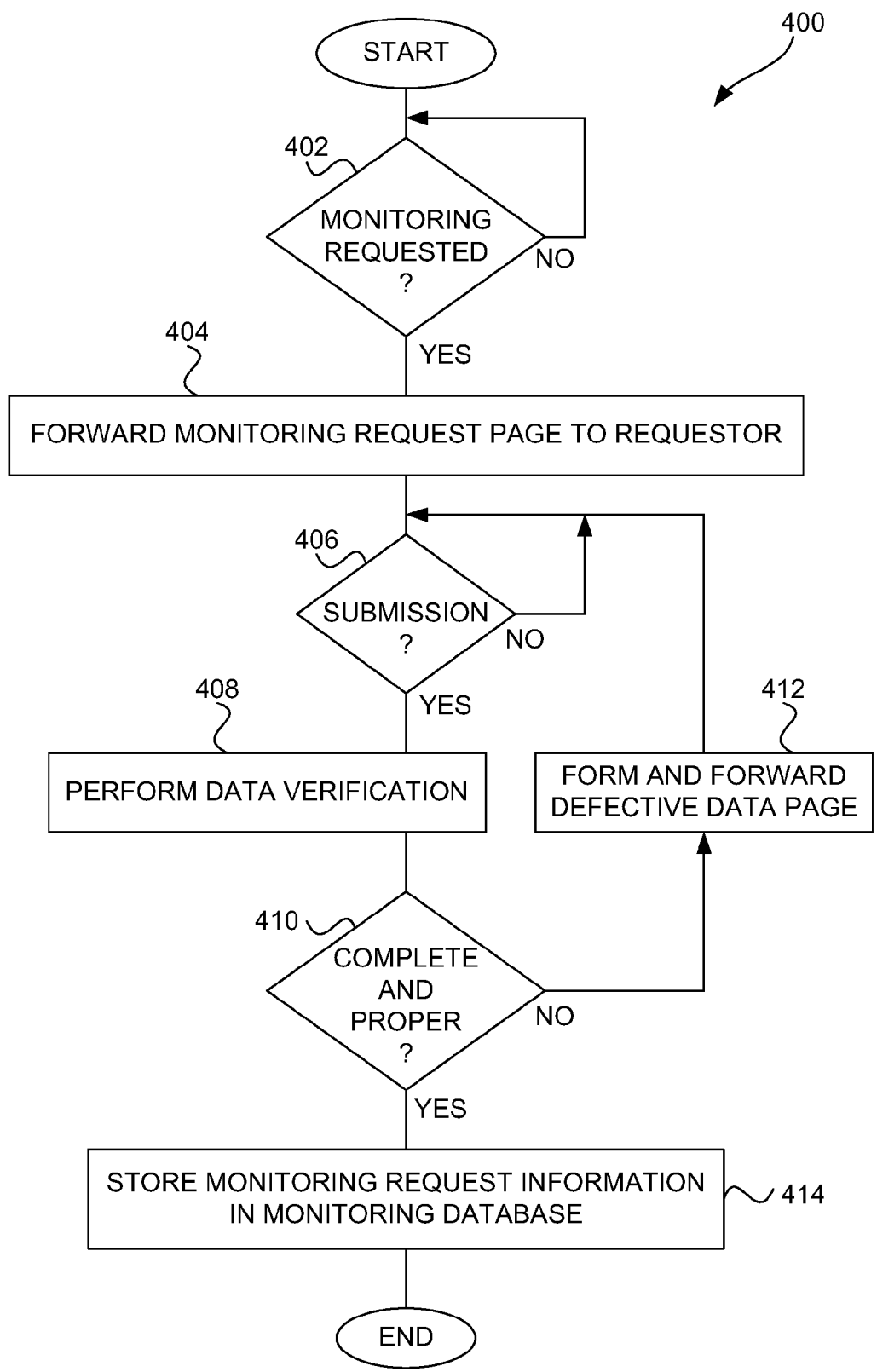
FIG. 4 is a flow diagram of server-side request monitoring processing according to one embodiment of the invention.

The requestor 312 can request the monitoring of websites in advance. For example, the requestor 312 could interact with the monitoring server 302 to request monitoring of a particular website. The monitoring server 302 performs processing to process such requests for monitoring from various requestors. FIG. 4 is a flow diagram of server-side request monitoring processing 400 according to one embodiment of the invention. The server-side request monitoring processing 400 is, for example, performed by the monitoring server 302 illustrated in FIG. 3.

The server-side request monitoring processing 400 begins with a decision 402 that determines whether a request for monitoring has been received. When the decision 402 determines that a request for monitoring has not yet been received, the server-side request monitoring processing 400 effectively awaits a monitoring request. Typically, the monitoring request will be provided by a requester, such as the requester 312 illustrated in FIG. 3. Once the decision 402 determines that a monitoring request has been received, the server-side request monitoring processing 400 continues. In other words, the server-side request monitoring processing 400 is invoked when a monitoring request is received.

After the monitoring request is received, a monitoring request page is forwarded 404 to the requestor. The monitoring request page requests information from the requestor detailing the monitoring to be performed. The requestor then operates to complete or provide information with respect to the monitoring request page. For example, the information requested by the monitoring request pages can include identification of website to be monitored, name, address and electronic mail address of requestor, type of monitoring desired, etc. To the extent that the monitoring server 302 already knows information, the monitoring request page can either not request such information or request confirmation of such information. Once the requester has completed providing the information requested by the monitoring request page, the requester submits the form back to the monitoring server 302.

Following the submission of the monitoring request page, a decision 406 determines whether a submission has been made. Here, the server-side request monitoring processing 400 determines whether the monitoring request page has been submitted back to the monitoring server 302. If the monitoring request page has not been submitted, then the decision 406 causes the server-side request monitoring processing 400 to await the submission of the monitoring request page. Once the decision 406 determines that the monitoring request page has been submitted, data verification is performed 408. The data verification can verify or check the information provided in the monitoring request page for common errors, such as incomplete information or improper selections.

Next, a decision 410 determines whether the data verification has determined that the submitted monitoring request page was complete and proper. When the decision 410 determines that the submitted monitoring request page was not complete and proper, a defective data page is formed and forwarded 412 to the requester so that needed information can be obtained. Then, the server-side request monitoring processing 400 returns to repeat the decision 406 and subsequent blocks so that the needed data can be provided by the requestor and then verified. On the other hand, when the decision 410 determines that the submitted monitoring request page is complete and proper, the information provided in the monitoring request page (and defective data page), i.e., monitoring request information, is stored 414 in the monitoring database 306. Thereafter, the server-side request monitoring processing 400 is complete and ends.

Once one or more websites have requested monitoring, an update determination process can be performed by the monitoring server 302 to determine when the monitored websites should be registered. Typically, the monitored websites have been previously registered so that the update determination process determines whether an updated registration is deemed appropriate or recommended.

Figure 5:
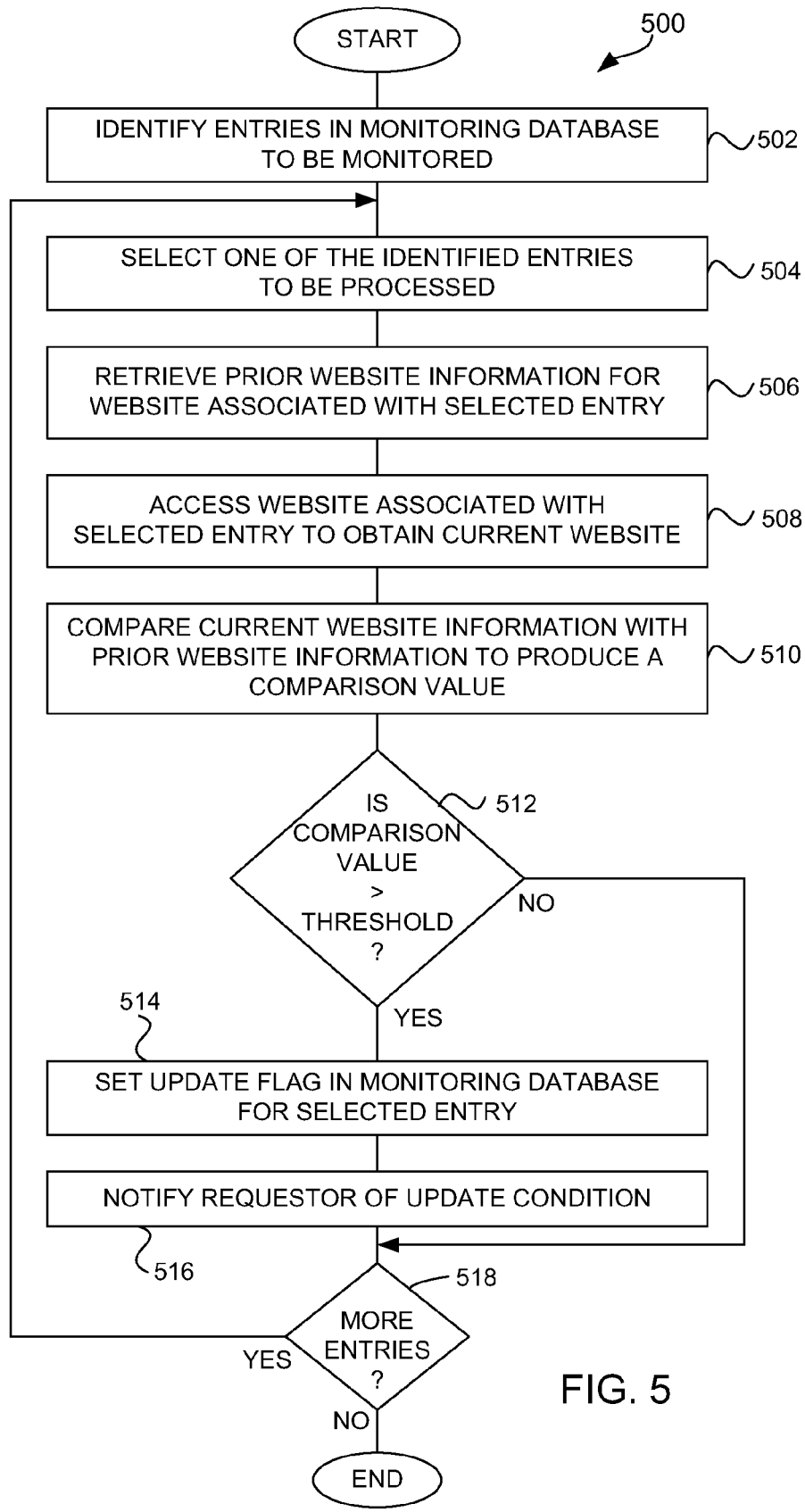
FIG. 5 is a flow diagram of update determination processing according to one embodiment of the invention.

FIG. 5 is a flow diagram of update determination processing 500 according to one embodiment of the invention. The update determination processing 500 is, for example, performed by the monitoring server 302 illustrated in FIG. 3.

Figure 7:
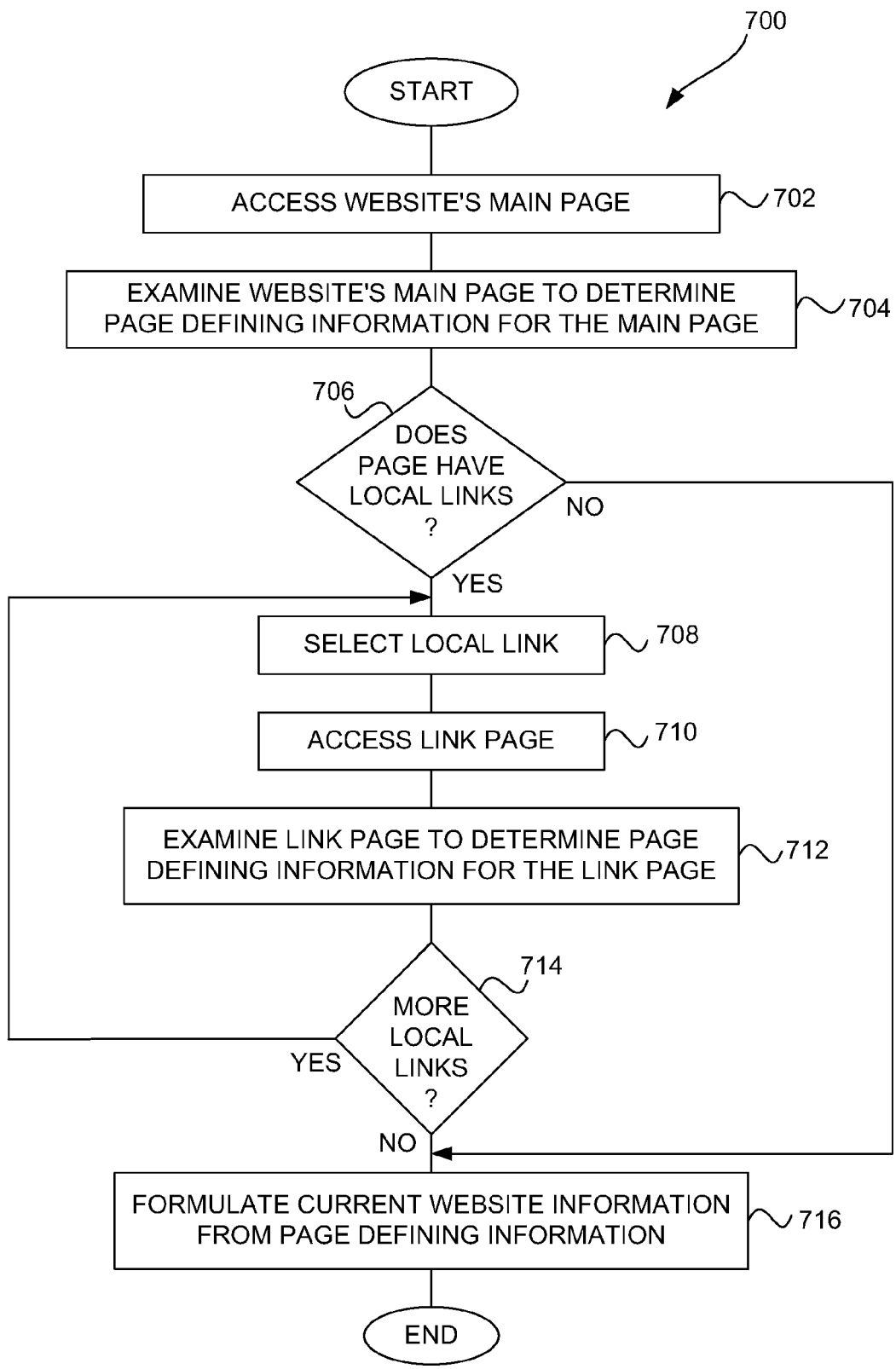
FIG. 7 is a flow diagram of website examination processing according to one embodiment of the invention.

The update determination processing 500 initially identifies 502 entries in the monitoring database to be monitored. Then, one of the identified entries to be processed is selected 504. Next, prior website information for the website associated with the selected entry is retrieved 506 from a storage location, such as the monitoring database 306 illustrated in FIG. 3. The website associated with the selected entry is then accessed 508 to obtain current website information. FIG. 7, discussed below, provides additional details on the generation of the current website information for the website associated with the selected entry.

After the current website information has been obtained, the current website information is compared 510 with the prior website information to produce a comparison value. Here, the comparison value reflects the degree or likelihood that the website associated with the selected entry has been altered or changed since the time at which the prior website information was obtained. The comparison can be performed in a variety of ways as discussed in greater detail below.

Next, a decision 512 determines whether the comparison value exceeds a predetermined threshold. When the comparison value does exceed the predetermined threshold, an update flag is set 514 in the monitoring database for the selected entry. Here, by setting the update flag, the registration monitoring system has effectively concluded that an updated registration should be pursued for the website associated with the selected entry. The update flag is utilized to mark the selected entry for further processing that achieves the updated registration (see FIG. 6). In addition, the requestor for the website associated with the selected entry is notified 516 of the update condition. In other words, the requestor is notified that it is desirable to perform an updated registration for the website associated with the selected entry. The notification provided to the requester can take many forms including electronic mail, regular mail carrier mail, telephone message, etc. Preferably, however, the notification is provided by electronic mail and includes a link to an update registration process. Such electronic mail notifications can provide information on the amount of content change and a recommendation for a registration. Still further, the electronic mail notifications can further provide an indication of where the content change occurs within the website.

In any case, after the notification 516, or directly following the decision 512 when the comparison value does not exceed the predetermined threshold, a decision 518 determines whether there are more entries to be processed. If the decision 518 determines that all of the entries have not been processed, then the update determination processing 500 returns to repeat the block 504 and subsequent blocks so that additional entries can be processed. On the other hand, once the decision 518 determines that all of the entries have been processed, the update determination processing 500 is complete and ends. However, it should be recognized that the update determination processing 500 can, for example, be performed on a periodic basis such as daily, weekly or monthly to periodically evaluate the websites being monitored by the registration monitoring system for the need to pursue an updated registration.

The registration monitoring system also includes an update registration process that serves to process updated registrations for the websites that have been determined to desire such updates.

Figure 6:
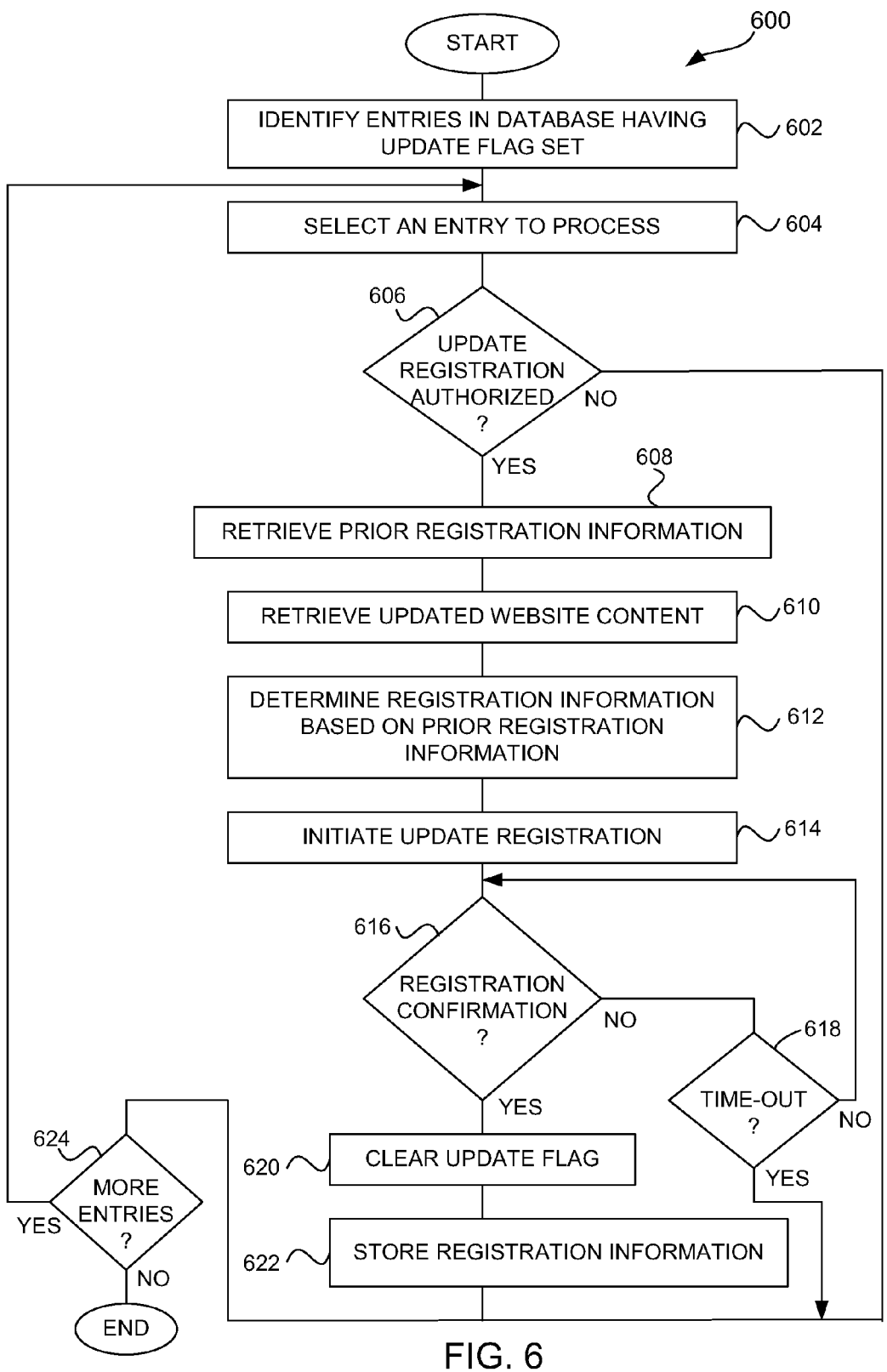
FIG. 6 is a flow diagram of update registration processing according to one embodiment of the invention.

FIG. 6 is a flow diagram of update registration processing 600 according to one embodiment of the invention. The update registration processing 600 is, for example, performed by the monitoring server 302 illustrated in FIG. 3.

The update registration processing 600 initially identifies 602 entries in the monitoring database having the update flag set. As noted above, the update determination processing 500 can, for example, be used to set the update flags to indicate that an updated registration should be pursued for the website associated with the selected entry. Next, one of the identified entries is selected 604 for processing. A decision 606 then determines whether update registration has been authorized. The authorization can obtained in a variety of ways including, for example, in advance, in response to a notification, or by a specific request. When the decision 606 determines that update registration has not been authorized, the processing is complete for the selected entry because the updated registration is not obtained because such has not been authorized.

On the other hand, when the decision 606 determines that update registration has been authorized, prior registration information is retrieved 608. Typically, the prior registration information would be retrieved from a database, such as the monitoring database 306 illustrated in FIG. 3. Then, updated website content is retrieved 610 for the website associated with the selected entry. The updated website content can, for example, be obtained by accessing the website directly and retrieving the content, or the updated website content could be submitted with a specific request or in response to a notification. Prior processing could have also previously stored the updated web content in the database (e.g., monitoring database 306).

After the updated website content is retrieved 610, registration information is determined 612 based on the prior registration information. Here, the registration information that is determined 612 is for use with an update registration. By utilizing the prior registration information in determining 612 the registration information, the amount of additional information that needs to be newly provided is substantially reduced because much of the registration information remains the same as it was with the prior registration information.

Next, an update registration is initiated 614. In one implementation, the update registration can be initiated 614 by submitting a request to an on-line registration server (e.g., registration server 316). A decision 616 then determines whether registration has been confirmed. When the decision 616 determines the registration has not yet been confirmed, a time-out decision 618 determines whether a time-out has occurred. If the decision 618 determines that a time-out has not yet occurred, the update registration processing 600 returns to repeat the decision 616 until either the registration has been confirmed or the time-out event has occurred. When the decision 616 determines that registration has been confirmed, the update flag for the selected entry is cleared 620. Further, the registration information for the selected entry is stored 622 for subsequent usage. For example, during a subsequent update registration processing, the registration information that is stored 622 at this point will become the prior registration information or at least a portion thereof.

Following the storage 622 of the registration information, as well as following the time-out decision 618 when the time-out has occurred or following the decision 606 when update registration is not authorized, a decision 624 determines whether additional entries are to be processed. When the decision 624 determines that all of the entries have not yet been processed, the update registration processing 600 returns to repeat the block 604 and subsequent blocks so that each of the entries in the database having the update flag set can be processed. Once the decision 624 determines that all of the entries have been processed, the update registration processing 600 is complete and ends. The update registration processing 600 can, for example, be periodically performed to process the update registrations for those of the websites being monitored that were indicated as desirable candidates for an updated registration.

The current website information can take a variety of forms and include vastly different types of information describing some attributes or parameters of the website. For example, in one implementation, the current website information could merely obtain the names of all of the pages associated with the website. Alternatively, the current website information could obtain all the page names and page sizes for the pages associated with the website. Then, if a certain percentage of the pages of the current website information have different names or different sizes as compared to the prior website information, the current website could be determined to likely require or be desirous of an updated registration.

The nature and acquisition of the current website information can be performed in a variety of ways. The approaches can also vary in complexity from simple to complex. Websites follow the HTTP protocol and HTML protocols and thus header information or META data can be examined. For example, the META data can include a date associated with a HMTL file. The pages of the website could also be retrieved and scanned to produce information on the websites organization, the contents of the pages, or checksums. Comparison programs or algorithms could also be used to perform more sophisticated comparisons between prior and current websites.

FIG. 7 is a flow diagram of website examination processing 700 according to one embodiment of the invention. The website examination processing 700 is, for example, performed by the block 508 illustrated in FIG. 5.

The website examination processing 700 initially accesses 702 the main page of the website to be examined. Next, the website's main page is examined 704 to determine page defining information for the main page. The page defining information can include a variety of different characteristics or parameters of the main page. For example, the page defining information can include one or more of file date, file size, word count, number of links, frame layout, tables, color, number of inputs, number of buttons and types of buttons, etc.

Next, a decision 706 determines whether the main page includes local links. The local links are other pages of the website that are associated with the main page. When the decision 706 determines that the page does have local links, each of the local links are processed to obtain page defining information. In particular, a local link is selected 708. Then, the link page associated with the selected local link is accessed 710. After the link page has been accessed, the link page is examined 712 to determine page defining information for the linked page. The page defining information determined for the linked page can be similar to the page defining information for the main page. In addition, the page defining information for the linked page might also include information as to its location in a website tree, namely, its level and parent. After the page defining information has been determined, a decision 714 determines whether there are more local links to be processed. When a decision 714 determines that there are more local links to be processed, the website examination processing 700 returns to repeat the block 708 and subsequent blocks so that additional links can be processed. On the other hand, when the decision block 714 determines that there are no more local links to be processed, or when the decision 706 determines that the web page does not have local links, the current website information is formulated 716 from the page defining information. Here, the current website information is formulated 716 based on the page defining information that has been obtained for the main page and any pages associated with local links of the website. Thereafter, the website examination processing 700 is complete and ends.

Within a website, there are often graphical links to images that are to be retrieved and provided with a page of the website. The website examination processing 700 could also monitor these graphic images as part of the page defining information. Alternatively, the website examination processing 700 could ignore graphical images. In some cases, it may be beneficial for the requestor to indicate whether or not graphical images should be part of the examination processing, as such may depend on the content and uniqueness to the website.

Figure 8A:
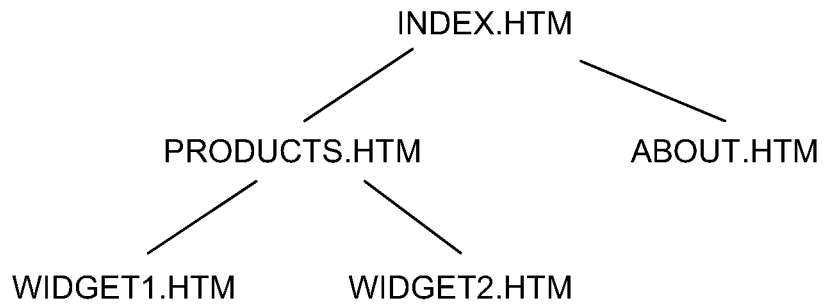
FIG. 8A is a representative tree diagram of the initial website version.

In an example provided below an initial website version is compared to a current website version. FIG. 8A is a representative tree diagram of the initial website version. The initial website includes five (5) pages, including index.htm, products.htm, widget1.htm, widget2.htm and about.htm. The page defining information for each of the pages in this example includes file name, position, file size, file date, and local links. The position is represented by level, parent level, number. For example, the position of widget2.htm is "2-1-3" because the file is at level two in the tree diagram, its parent file is at level 1, and its sequential number is 3. The initial website information then results from the page defining information. Table 1 below indicates the page defining information for the initial website.

TABLE 1

| NAME | POSITION | SIZE (kB) | DATE | LINKS |
| --- | --- | --- | --- | --- |
| index.htm | 0-0-1 | 5 | Jan. 1, 1999 | banner.jpg |
| Products.htm | 1-0-2 | 12 | Jan. 1, 1999 | |
| Widget1.htm | 2-1-3 | 15 | Jan. 1, 1999 | image1.jpg |
| Widget2.htm | 2-1-4 | 18 | Jan. 1, 1999 | image2.jpg |
| About.htm | 1-0-5 | 7 | Jan. 1, 1999 | |

Figure 8B:
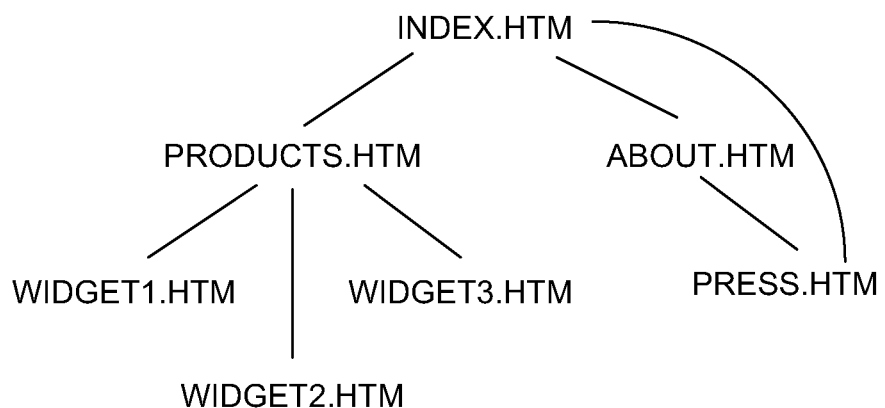
FIG. 8B is a representative tree diagram of the current website version.

Subsequently, the website is changed to the current website version. FIG. 8B is a representative tree diagram of the current website version. The current website includes seven (7) pages, including index.htm, products.htm, widget1.htm, widget2.htm, widget3.htm, about.htm and press.htm. The page defining information for each of the pages in this example includes file name, position, file size, file date, and local links. The current website information then results from the page defining information. Table 2 below indicates the page defining information for the current website.

TABLE 2

| NAME | POSITION | SIZE (kB) | DATE | LINKS |
| --- | --- | --- | --- | --- |
| index.htm | 0-0-1 | 5 | Jun. 1, 1999 | banner.jpg |
| Products.htm | 1-1-2 | 13 | Jun. 1, 1999 | |

TABLE 2-continued

| NAME | POSITION | SIZE (kB) | DATE | LINKS |
| --- | --- | --- | --- | --- |
| Widget1.htm | 2-2-3 | 15 | Jan. 1, 1999 | image1.jpg |
| Widget2.htm | 2-2-4 | 18 | Jan. 1, 1999 | image2.jpg |
| Widget3.htm | 2-2-5 | 10 | Jun. 1, 1999 | image3.jpg |
| About.htm | 1-1-6 | 7 | Jun. 1, 1999 | |
| Press.htm | 2-6-7, 2-0-7 | 6 | Jun. 1, 1999 | |

Hence, following website examination processing, the system can compare the page defining information for the initial website with the page defining information of the current website. When the degree or type of change to the website from the initial website to the current website exceeds a minimum threshold, than update registration can be triggered. Accordingly, update registrations are pursued or recommended only when beneficial to the website owner. With respect to the example provided above, two new files have been added to the website (i.e., widget3.htm and press.htm), three files were modified, and one additional local link has been added. Also, two of the three modified files were increased in size by 1 kilobyte (kB). Given these changes to the website, the system can determine that the degree or types of change to the website indicate that an updated registration be pursued or recommended. A weighting scheme can be used to weight each of the different attributes of the page defining information differently.

In more simplified embodiments, the website examination could just consider a particular page, such as a home page, overall all website size, the file names of the website, tree structure, or modification dates. Checksums of some or all of the pages could also be used to identify when any change is made to a page of a website. However, better result can be had by considering the whole website because degree of change in the content of the website is important. For example, if certain pages were updated (e.g., contact page) to update an address change for the business associated with the website, then an updated registration would not be necessary. However, the addition of a new product page to the website would make an updated registration more important.

In any case, the minimum threshold that triggers or recommends the updated registration can be selectively set to different levels. For example, the different levels can reflect the aggressiveness with which the website owner desires to update its registration. An owner desiring more aggressiveness would lower the minimum threshold, whereas the owner desiring less aggressiveness would increase the minimum threshold.

Still another aspect of the invention is that the above-mentioned monitoring processing can be used to monitoring for unauthorized copying of websites. By monitoring the World Wide Web (WWW) for websites that have similar website information (e.g., content) using the examination techniques mentioned above, the invention can determine those websites that have copied content from one's website. This is an automated processes that compares an original website with numerous other websites on the WWW and notifies the administrator of the original website when websites with similar content are found.

Yet another aspect of the invention is that domain name monitoring can be automatically performed. Automatic monitoring of domain names is beneficial to holders of similar domain names, trademark owners, and competitors.

Figure 8C:
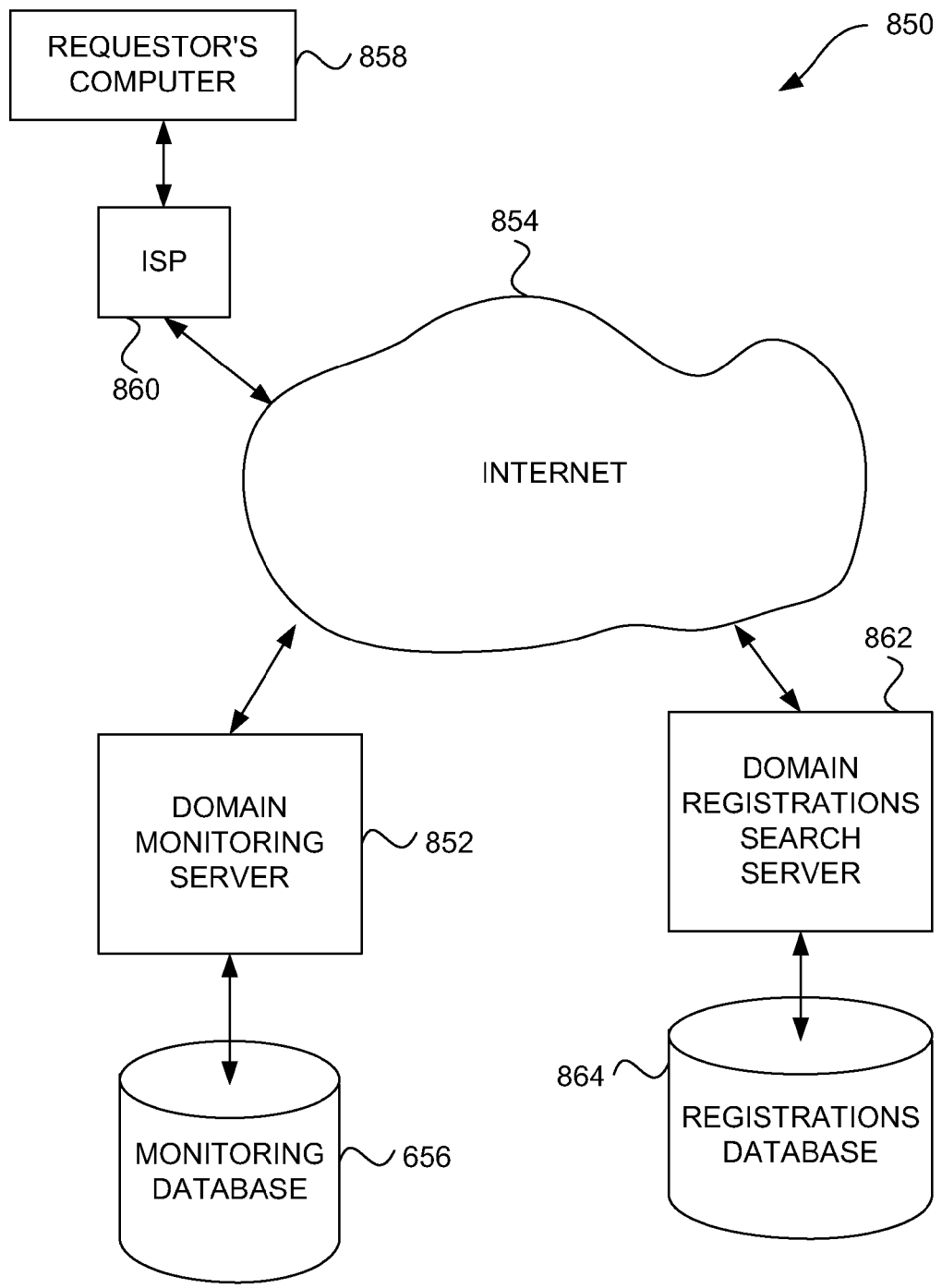
FIG. 8C is a block diagram of a domain monitoring system according to one embodiment of the invention.

FIG. 8C is a block diagram of a domain monitoring system 850 according to one embodiment of the invention. The domain monitoring system 850 monitors the registration of domain names. The domain monitoring system 850 includes a domain monitoring server 852 that couples to the Internet 854. The domain monitoring server 852 also couples to a monitoring database 856. The monitoring database 856 stores information regarding the domains to be monitored by the domain monitoring system 850.

The domain monitoring system 850 also includes a requestor's computer 858 that couples to the Internet 854 through an ISP 860. A requestor operates the requestor's computer 858 to request that a domain name be monitored and that notifications be provided to the requestor when similar registrations to the domain name have been registered. The domain monitoring server 852 stores information describing monitoring requested by the requestor and performs the requested monitoring.

The domain monitoring system 850 also includes a domain registrations search server 862. The domain registrations search server 862 is coupled to the Internet 854. The domain registrations search server 862 is also coupled to a registrations database 864. In one embodiment, the domain registration search server 862 and the domain registration database 864 are provided by a registrar of a registry system that controls the registration of domain names. For example, in the United States, Network Solutions, Inc. was the original registrar and remains a registrar today along with several other registrars. The registrations database 864 stores information on domain names that have been registered. For example, for each domain name that has been registered, the registration database 864 stores information such as registrant, date of registration, technical contact, administrative contact, billing contact, and host server. The technical contact information, the billing contact information and the administrative contact information normally include at least an individual's name and electronic mail address.

The domain monitoring system 850 operates by a requestor's computer 858 initiating (on behalf of the requestor) a request to the domain monitoring server 852 to monitor a particular domain name. The monitoring request can be achieved by a requestor utilizing a network browser (e.g., HTML browser) to complete a form that identifies the name and email address for the requestor as well as identifies the domain name to be monitored. In addition, the monitoring request can also provide an indication of the depth of monitoring requested. For example, the monitoring could be for U.S. variations of the requestor's domain name or watching of international registrations for the requestor's domain name. The domain monitoring server 852 stores the request in the monitoring database 856. Thereafter, periodically, the domain monitoring server 852 retrieves the domain names to be monitored from the monitoring database 856. For each of the domain names to be monitored, the domain monitoring server 852 queries the registration database 864 for an indication of whether or not similar domain names have been registered. Typically, the domain name being monitored has already been registered by the requestor, and thus the monitoring of the domain names searches for new registrations of domain names that are substantially similar to the domain name being monitored. For example, if the requestor had registered the domain name "amazon.com", the monitoring of the domain names could determine whether any amazon?.? are newly registered, where "?" represents one or more wildcard characters. Such monitoring could instead also search for more specific, and perhaps predetermined, domain names to limit the processing overhead. In any case, the monitoring for this example might flag new registrations for amazon.net, amazon.org, amazon.co.uk, amazon.org.uk, amazon.to, amazons.com, amazons.net, and amazons.org.

The domain monitoring server 852 can search the registrations database 864 through the domain registration search server 862 provided by the registrar in one embodiment of the invention. In another embodiment of the invention, the domain monitoring server 852 would be able to effectively bypass the domain registration search server 862 (or flow through) to access the registrations database 864. Typically, however, the domain monitoring server 852 will have to satisfy security requirements and parameters required by the domain registration search server 862 when attempting to access the registrations database 864.

Figure 9:
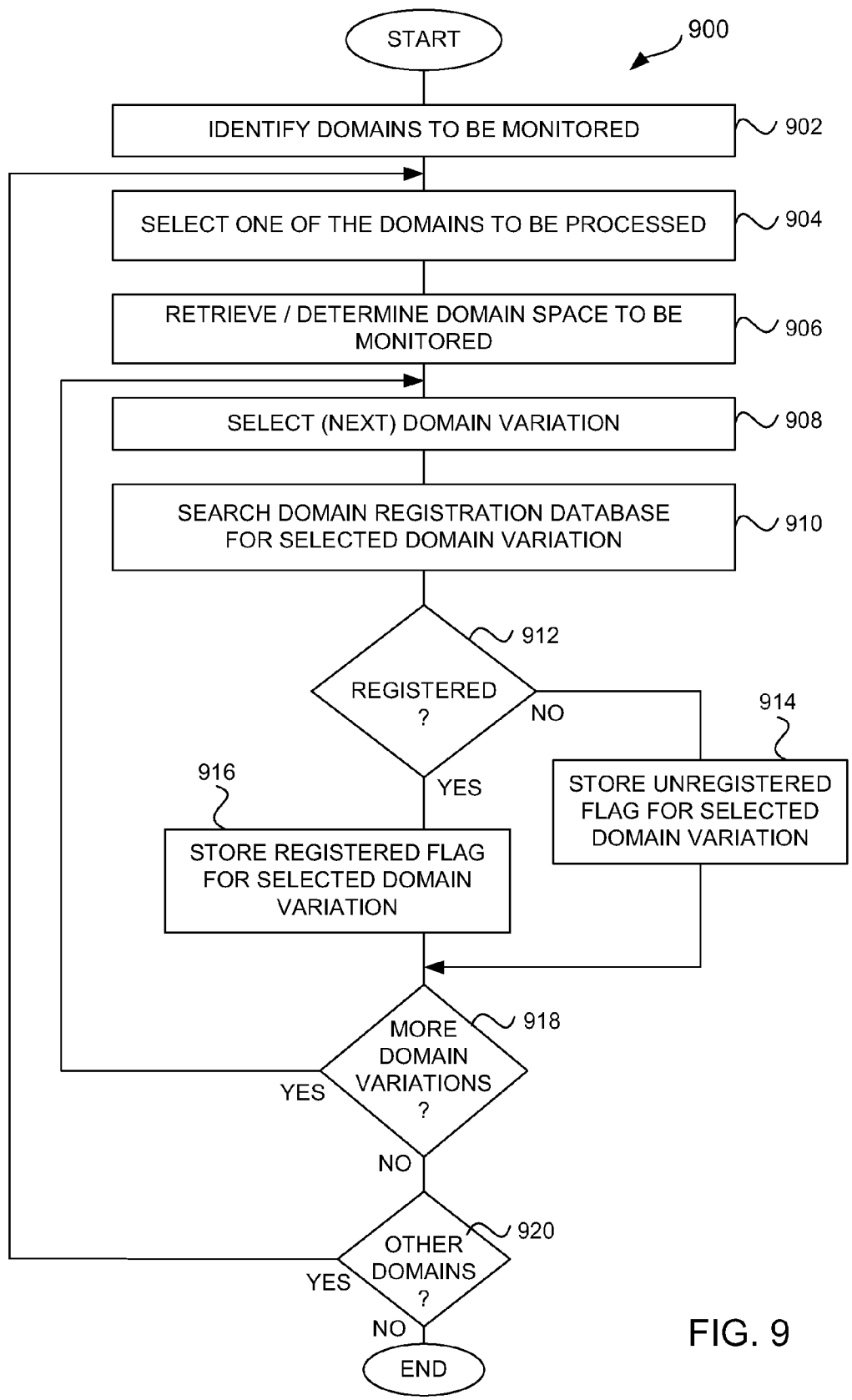
FIG. 9 is flow diagram of domain monitoring process according to one embodiment of the invention.

FIG. 9 is flow diagram of domain monitoring process 900 according to one embodiment of the invention. The domain monitoring processing 900 is, for example, performed by the domain monitoring server 852 illustrated in FIG. 8C.

The domain monitoring processing 900 initially identifies 902 domains to be monitored. Here, the domains to be monitored represent a particular domain name that the requestor desires to search about and to be notified when similar domain names have been registered. After the domains to be monitored have been identified 902, one of the domains to be processed is selected 904. Then, the domain space to be monitored is retrieved or determined 906. In one embodiment, the domain space about a domain name to be monitored can be predetermined by the requestor and in such case is simply retrieved 906. On the other hand, when the domain space about a domain name to be monitored is not predetermined by the requestor, then the domain space can be determined by the domain monitoring server 852. In some cases, the domain monitoring server 852 may need to access different registrations databases.

After the domain space has been obtained, a domain variation is selected 908 from the domain space. In other words, the domain space includes various domain variations associated with the primary domain. Then, the domain registration database is searched 910 for the selected domain variation. A decision 912 then determines whether the selected domain variation has been registered. When the decision 912 determines that the selected domain variation has not been registered, then an unregistered flag is stored 914 for the selected domain variation. On the other hand, when the decision 912 determines that the selected domain variation has been registered, a registered flag is stored 916 for the selected domain variation.

Next, following either the storing operations 914 or 916, a decision 918 determines whether there are more domain variations within the domain space to be processed. When the decision 918 determines that there are more domain variations to be processed, then the domain monitoring processing 900 returns to repeat the selecting operation 908 and subsequent operations. On the other hand, when the decision 918 determines that there are no more domain variations to be processed, then a decision 920 determines whether there are other domains to be monitored. When the decision 920 determines that there are other domains to be monitored, then the domain monitoring processing 900 returns to repeat the operation 904 and subsequent operations. Alternatively, when the decision 920 determines that there are no other domains to be monitored, then the domain monitoring processing 900 is complete and ends.

The domain monitoring process 900 can operate continuously or can be periodically invoked. It is likely that periodic invocation of the domain monitoring process 900 will be adequate to sufficiently monitor the registration of domains.

Figure 10:
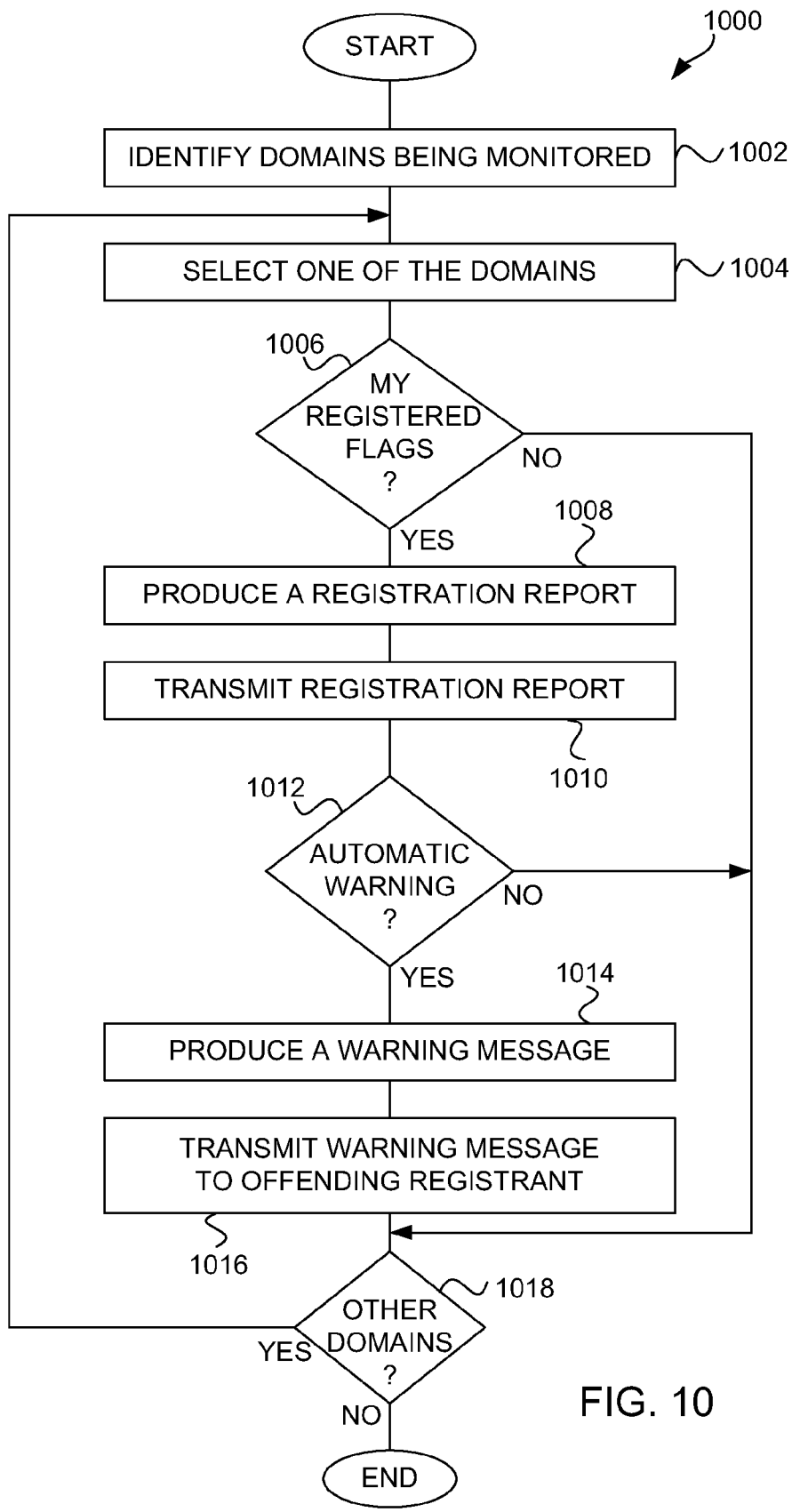
FIG. 10 is a flow diagram of registration notification processing according to one embodiment of the invention.

FIG. 10 is a flow diagram of registration notification processing 1000 according to one embodiment of the invention.

The registration notification processing 1000 is, for example, performed by the domain monitoring server 852 illustrated in FIG. 8C.

The registration notification processing 1000 serves to notify the requestor when domain variations of the monitored domain are registered. Specifically, the registration notification processing 1000 initially identifies 1002 domains being monitored. Then, one of the domains being monitored is selected 1004. A decision 1006 then determines whether any of the domain variations associated with the selected domain have a registered flag. When the decision 1006 determines that none of the domain variations has a registered flag, then there is no need to notify the requestor for the selected domain because none of the domain variations has been registered. In one embodiment, the operations 1002-1006 can be performed by a database query in the cases where a database (e.g., monitoring database 856) holds the registered/unregistered flags.

On the other hand, when the decision 1006 determines that there are one or more registered flags for the domain variations of the selected domain, then the registration notification processing 1000 performs additional processing to not only notify the requestor but also possibly warning the new registrant. More particularly, a registration report is produced 1008. In one embodiment, the registration report contains information on the recent registrations that are similar (e.g., domain variations) to the domain name being monitored. The information in the registration report for each of these recent registrations can, for example, include registrant, date of registration, technical contact, administrative contact, billing contact, and host server. Then, the registration report is transmitted 1010 to the requestor for the selected domain.

Next, a decision 1012 determines whether automatic warnings have been requested. In one embodiment, automatic warnings can be requested when the domain monitoring is requested. When the decision 1012 determines that automatic warnings have been requested, then a warning message is produced 1014. After the warning message has been produced 1014, the warning message is transmitted 1016 to the offending registrant. Alternatively, when the decision 1012 determines that the automatic warning has not been requested, then the operations 1014 and 1016 are bypassed.

In any case, following the transmission 1016 of the warning message, or following the decisions 1006 or 1012 when their conditions are not satisfied, a decision 1018 determines whether there are other domains to be processed. When the decision 1018 determines that there are other domains to be processed, the registration notification processing 1000 returns to repeat the operation 1004 and subsequent operations so that other monitoring requests can be processed. Alternatively, when the decision 1018 determines that there are no other domains to be processed, the registration notification processing 1000 is complete and ends.

The transmission 1010 of the registration report can be achieved in a variety of ways, including electronic mail or facsimile. Also, the warning messages can be automatically sent according to the invention. Alternatively, the warning letters could not be sent automatically but, instead, be sent following consent of the requestor. For example, the requestor could be informed by a registration report via email that a similar domain has been registered by an offending registrant, then in a reply to the electronic mail registration report or by particular request, the requestor can authorize the sending of a warning message to the offending registrant.

Although the domain monitoring discussed above with respect to FIGS. 8-10 monitors for recent domain registrations, domain monitoring can also monitor for implementation of an active website using a domain name that is similar to the domain name being monitored. Here, periodically the domain monitoring server 852 could search the Internet 854 for a website at domain names deemed similar to the domain name being monitored. Receiving back an error when the website is not found indicates that the offending domain name, even if registered, is not in use (i.e., inactive). The requestor can also be notified when active website with offending domain names are discovered.

Such monitoring can also be used with the monitoring for new registrations. For example, after a new registration for an offending domain name is found, the offending domain name can be monitored for activation of its website. In such case, the registration report can become a registration and activation report.

The various aspect of the invention can be used separately or in any combination. Although the invention has been described in context of the Internet, more generally, the invention can use any network, including a local, wide-area, or global network.

The invention is preferably implemented in software, but can be implemented in hardware or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, carrier waves. The computer readable medium can also be distributed over a network coupled computer systems so that the computer readable code is stored and executed in a distributed fashion.

The advantages of the invention are numerous. Different embodiments or implementations may yield one or more of the following advantages. One advantage of the invention is that on-line forms or registrations are made substantially easier to complete. Another advantage of the invention is that expert guidance can be provided to assist in the completion of on-line forms or registrations. Still another advantage of the invention is that automatic approaches are able to evaluate the need to update a registration.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer-implemented method for determining whether a copyright registration update is needed, said method comprising:

comparing at least a portion of a website against a corresponding portion of an earlier stored version of the website that was previously subject to a copyright registration with the U.S. Copyright Office to produce a change indication;

determining that the copyright registration update is needed for the website based on the change indication;

producing copyright registration application information when it is determined that the copyright registration update is needed for the website; and storing the copyright registration application information.

2. A program storage device readable by a machine, tangibly storing a program of computer instructions executable by the machine to determine whether a copyright registration update is needed, said program storage device comprising:

computer instructions for comparing at least a portion of a website against data for a corresponding portion of an earlier version of the website that was previously subject to a copyright registration with the U.S. Copyright Office to produce a change indication; and computer instructions for determining that the copyright registration update is needed for the website based on the change indication.

3. A computer-implemented method for detecting a need to update a prior copyright registration for at least a portion of a website provided on a network, said method comprising:

(a) monitoring changes to the at least a portion of the website to determine a change value;
(b) comparing the change value with a threshold value; and
(c) determining the need to update the prior copyright registration of the at least a portion of the website when the change value exceeds the threshold value.

4. A computer implemented method as recited in claim 3, wherein said determining whether the copyright registration update is needed for the website comprises:

comparing the change value to a user-alterable threshold level; and
determining that the copyright registration is needed when the change value exceeds the user-alterable threshold level.

5. A computer implemented method as recited in claim 4, wherein said method further comprises:

providing an electronic notification to a contact for the website when it is determined that another copyright registration is needed for the website.

6. A computer implemented method as recited in claim 1, wherein said method further comprises:

providing an electronic message to a contact for the website when it is determined that the copyright registration update is needed for the website.

7. A computer implemented method as recited in claim 6, wherein said method further comprises:

determining whether the copyright registration update is authorized to be automatically performed; and
automatically performing an on-line copyright registration for the website when the copyright registration update is authorized to be automatically performed.

8. A computer implemented method as recited in claim 1, wherein said method further comprises:

determining whether the copyright registration update is pre-authorized to be performed; and
automatically performing a copyright registration for the website when it is determined that the copyright registration update is pre-authorized the pre-authorization being provided prior to determination by said determining whether the copyright registration update is needed.

9. A computer-implemented method as recited in claim 1, wherein said comparing comprises:

identifying an address location for the website; and
periodically crawling the address location for the website to determine an amount or degree of content change at the website as compared to the earlier stored version of the website, and
wherein said determining determines that another copyright registration with the U.S. Copyright Office is needed for the website when the amount or degree of content change exceeds a predetermined threshold.

10. A computer implemented method as recited in claim 9, wherein said method further comprises:

providing a notification to a contact for the website when it is determined that another copyright registration is needed for the website.

11. A computer implemented method as recited in claim 10, wherein the notification is an electronic notification automatically sent to the contact when it is determined that another copyright registration is needed for the website.

12. A computer implemented method as recited in claim 11, wherein the electronic notification further provides an indication of where the content change occurs within the website.

13. A computer implemented method as recited in claim 12, wherein the email notification provides information on the amount of content change.

14. A computer implemented method as recited in claim 1, wherein said method further comprises:

registering of the website again with the U.S. Copyright Office based at least in part on the copyright registration application information when it is determined that the copyright registration update is needed for the website.

15. A computer implemented method as recited in claim 14, wherein said registering of the website is an on-line registration of the website via on-line submission with the U.S. Copyright Office.

16. A computer implemented method as recited in claim 1, wherein said method further comprises:

on-line registering of the website with the U.S. Copyright Office when it is determined that the copyright registration update is needed for the website, wherein the on-line registration references the previous registration.

17. A program storage device as recited in claim 2, wherein said program storage device further comprises:

computer instructions for producing copyright registration application information when it is determined that the copyright registration update is needed for the website.

18. A program storage device as recited in claim 2, wherein said program storage device further comprises:

computer instructions for storing descriptive information on a prior version of a website that was previously subject to a prior copyright registration with the U.S. Copyright Office; and
computer instructions for storing prior registration information pertaining to the prior copyright.

19. A program storage device as recited in claim 18, wherein said computer instructions for comparing at least a portion of a website against data for a corresponding portion of an earlier version of the website includes at least computer instructions for comparing at least a portion of descriptive information on a current version of the website against at least a portion of the descriptive information on the prior version of the website that was previously subject to the prior copyright registration to produce the change indication.

20. A program storage device as recited in claim 19, wherein said program storage device further comprises:

computer instructions for determining update registration information for a subsequent copyright registration for the website when said computer instructions for determining determines that the copyright registration update is needed, the update registration information automatically being based at least in part on the prior registration information pertaining to the prior copyright registration of the website.

21. A program storage device as recited in claim 20, wherein said program storage device further comprises:

computer instructions for initiating the subsequent copyright registration for the website with the U.S. Copyright Office; and computer instructions for storing the subsequent registration information pertaining to the subsequent copyright registration of the website.

22. A program storage device as recited in claim 21, wherein said method further comprises:
   computer instructions for determining whether the subsequent copyright registration is pre-authorized to be performed; and
   computer instructions for automatically performing an on-line copyright registration submission with the U.S. Copyright Office for the website when the subsequent copyright registration is pre-authorized, the pre-authorization being provided prior to determination by said determining (d) that the copyright registration update is needed.

23. A program storage device as recited in claim 21, wherein said method further comprises:
   computer instructions for providing an electronic notification to a contact for the website when said computer instructions for determining determines that the copyright registration update is needed for the website.

24. A program storage device as recited in claim 23, wherein the electronic notification provides information on the amount of content change, and an indication of where the content change occurs within the website.

25. A program storage device as recited in claim 21,
   wherein the descriptive information on the prior version of the website and the current version of the website include page defining information,
   wherein said computer instructions for comparing compares page defining information for the current version of the website against page defining information for the prior version of the website, and
   wherein the page defining information pertains to a plurality of attributes.

26. A program storage device as recited in claim 25, wherein, when producing the change indication, at least one of the attributes being compared is weighted differently than another of the attributes.

27. A program storage device as recited in claim 2, wherein the change indication includes at least a degree of change, and
   wherein said computer instructions for determining whether the copyright registration update is needed for the website comprises:
      computer instructions for comparing the degree of change to a user-alterable threshold level; and
      computer instructions for determining that the copyright registration is needed when the degree of change exceeds the user-alterable threshold level.

28. A program storage device as recited in claim 2,
   wherein said computer instructions for comparing comprises:
      computer instructions for identifying an address location for the website; and
      computer instructions for periodically crawling the address location for the website to determine an amount or degree of content change at the website as compared to the earlier stored version of the website, and
   wherein said computer instructions for determining determines that another copyright registration with the U.S. Copyright Office is needed for the website when the amount or degree of content change exceeds a predetermined threshold.

\* \* \* \* \*